(12) United States Patent
Murakami

(10) Patent No.: US 10,007,248 B2
(45) Date of Patent: Jun. 26, 2018

(54) NUMERICAL CONTROLLER FOR RETRACTION CONTROL

(71) Applicant: FANUC Corporation, Minamitsuru-gun, Yamanashi (JP)

(72) Inventor: Hiroki Murakami, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 242 days.

(21) Appl. No.: 14/929,702

(22) Filed: Nov. 2, 2015

(65) Prior Publication Data
US 2016/0147213 A1  May 26, 2016

(30) Foreign Application Priority Data

Nov. 21, 2014 (JP) .................................. 2014-236648

(51) Int. Cl.
*G05B 19/19* (2006.01)
*G05B 19/4103* (2006.01)

(52) U.S. Cl.
CPC ......... *G05B 19/19* (2013.01); *G05B 19/4103* (2013.01); *G05B 2219/50109* (2013.01); *G05B 2219/50118* (2013.01)

(58) Field of Classification Search
CPC ................ G05B 19/19; G05B 19/4103; G05B 2219/50118; G05B 2219/50109
USPC ......................................................... 700/188
See application file for complete search history.

(56) References Cited

U.S. PATENT DOCUMENTS

| 5,814,956 A | 9/1998 | Kono et al. |
| 6,591,148 B1 * | 7/2003 | Masuda ............... G05B 19/184 |
| | | 409/274 |
| 2009/0082900 A1 | 3/2009 | Akaiwa et al. |
| 2014/0005823 A1 | 1/2014 | Otsuki |
| 2014/0103853 A1 | 4/2014 | Yoshida et al. |

FOREIGN PATENT DOCUMENTS

| JP | 8-54914 A | 2/1996 |
| JP | 2002-182714 A | 6/2002 |
| JP | 2007-188170 A | 7/2007 |
| JP | 2009-075799 A | 4/2009 |
| JP | 2011-118709 A | 6/2011 |
| JP | 2014-010566 A | 1/2014 |
| WO | WO-2012-176268 A1 | 10/2012 |

OTHER PUBLICATIONS

JP2002182714 Translation from Espacenet.*
Notification of Reasons for Refusal dated Aug. 16, 2016 in Japanese Patent Application No. 2014-236648 (3 pages) with an English Translation (2 pages).

* cited by examiner

*Primary Examiner* — Thomas C Lee
*Assistant Examiner* — Alan Chu
(74) *Attorney, Agent, or Firm* — Drinker Biddle & Reath LLP

(57) ABSTRACT

A numerical controller which controls a five-axis machining machine having two rotary axes generates speed data for deceleration stop along movement paths when a stop signal that requires interruption of machining and retraction is sensed, and based on the speed data, generates stop retraction path command data combining a path for the deceleration stop along the movement paths and a retraction path receding from the movement paths.

2 Claims, 3 Drawing Sheets

NUMERICAL CONTROLLER FOR RETRACTION CONTROL

RELATED APPLICATION DATA

This application claims priority under 35 U.S.C. § 119 and/or § 365 to Japanese Application No. 2014-236648 filed Nov. 21, 2014, the entire contents is incorporated herein by reference.

BACKGROUND OF THE INVENTION

Field of the Invention

The present invention relates to a numerical controller, and more particularly, to a numerical controller configured to perform retraction control such that no trace is left on a machined surface of a workpiece when machining is interrupted.

Description of the Related Art

In conventional machine tools including five-axis machining machines, machining may sometimes be interrupted due to power failure or replacement of a tool. If the machining is expected to be stopped, a signal that requests the stop is activated manually or automatically. Thereupon, a numerical controller senses the signal and stops servomotors. This signal that requests the servomotors to be stopped is called "stop signal".

However, the tool is in contact with a workpiece during the machining. If the drive of the motors is simply stopped, the motors stop with the tool and the workpiece in contact with each other, possibly hindering subsequent operations. In general, therefore, control is needed to operate a spindle or the like so as to separate the tool from the workpiece when the machining is interrupted. The operation for separating the tool from the workpiece is called "retraction".

Japanese Patent Application Laid-Open No. 08-054914 discloses a technique for controlling a motor for tool axis feed to retract a tool to a safe area in case of power failure. In the technique disclosed in this patent document, interruption of machining and retraction are achieved in the following procedures.

<A1> Turning-on of a stop signal is sensed during the machining.

<A2> The tool is decelerated and stopped along an instructed machining path, whereupon the machining is interrupted.

<A3> The tool is retracted by a prescribed tool-direction distance at a position where the machining is interrupted.

The tool is decelerated and stopped along the instructed machining path in Procedure <A2> in order to prevent a workpiece from being deformed due to the interruption.

In a five-axis machining machine, the direction of a tool relative to a workpiece changes during machining, so that the direction of retraction is generally defined as a direction (hereinafter referred to as "tool direction") from the distal end to the proximal end of the tool along the tool length. If the tool is retracted in any other direction than the tool direction, the tool and the workpiece may interfere with each other and be damaged, depending on the shape of the workpiece.

In the five-axis machining machine, moreover, the tool direction is controlled by two rotary axes, so that it is changed from moment to moment during the machining. Thus, in performing the retraction in the five-axis machining machine, the direction in which the tool or a table is moved depends on the positions of the two rotary axes. In a numerical controller for controlling the five-axis machining machine comprising these two rotary axes, therefore, the retraction is performed in a direction calculated according to the positions of the two rotary axes.

In the above technique disclosed in Japanese Patent Application Laid-Open No. 08-054914, the tool is retracted in the tool direction after it is temporarily decelerated and stopped during the machining, as described in Procedures <A2> and <A3>. Thus, the machining is stopped with the tool and the workpiece in contact with each other. This causes a problem that a trace (cutter mark) is left on a machined surface of the workpiece, thereby reducing the surface quality, as in a prior art retraction operation shown in the schematic diagram of FIG. 6.

SUMMARY OF THE INVENTION

Accordingly, the object of the present invention is to provide a numerical controller capable of performing retraction control such that no trace is left on a machined surface of a workpiece when machining is interrupted.

A numerical controller according to the present invention controls a machining machine comprising at least two linear axes and at least one rotary axis based on a machining program, thereby machining a workpiece placed on a table. The numerical controller comprises a command reading unit configured to read and analyze the machining program and generate command data indicative of movement paths for the linear and rotary axes, a stop signal sensing unit configured to sense a stop signal which requests interruption of the machining and retraction, a deceleration stop unit configured to generate speed data for deceleration stop along the movement paths when the stop signal is sensed by the stop signal sensing unit, a stop-retraction path generation unit configured to generate stop retraction path command data indicative of a stop retraction path, which combines a path for the deceleration stop along the movement paths and a retraction path receding from the movement paths, based on the command data and the speed data when the stop signal is sensed by the stop signal sensing unit, and an interpolation unit configured to obtain each axis position for each interpolation period based on the stop retraction path command data when the stop signal is sensed by the stop signal sensing unit.

An amount of retraction, which is equivalent to a distance by which the retraction path recedes from the movement paths, may be previously set in the numerical controller or set by the machining program.

According to the present invention, a tool is decelerated as it moves away from the workpiece during retraction, so that the retraction can be performed without reducing the quality of the machined surface. Even in simultaneous five-axis machining in which the tool direction changes from moment to moment, moreover, the tool can be controlled so as to be always separated from the workpiece in alignment with the tool direction, so that the retraction can be performed without reducing the quality of the machined surface. In the present invention, moreover, operations for the deceleration stop and the retraction are simultaneously performed, so that the time required for the completion of the retraction after detection of the stop signal can be reduced.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Interruption of machining and retraction carried out by a numerical controller according to the present invention are performed in the following procedures.

<B1> Turning-on of a stop signal is sensed during the machining.

<B2> A tool is decelerated and stopped along a "stop-retraction path" formed by superimposing tool-direction retraction on a command path.

Figure 1:
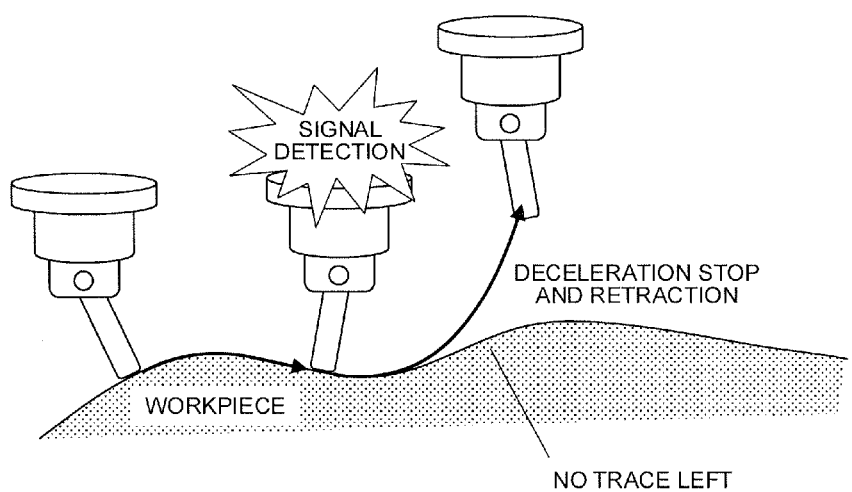
FIG. 1 is a schematic diagram showing a retraction operation performed by a numerical controller according to the present invention.

When a retraction operation is performed in the above procedures when the machining is interrupted, the tool direction changes from moment to moment during the deceleration stop of Procedure <B2> above in a five-axis machining machine, so that the retract direction is also changed correspondingly from moment to moment. FIG. 1 is a schematic diagram showing the retraction operation performed by the numerical controller according to the present invention.

Figure 2:
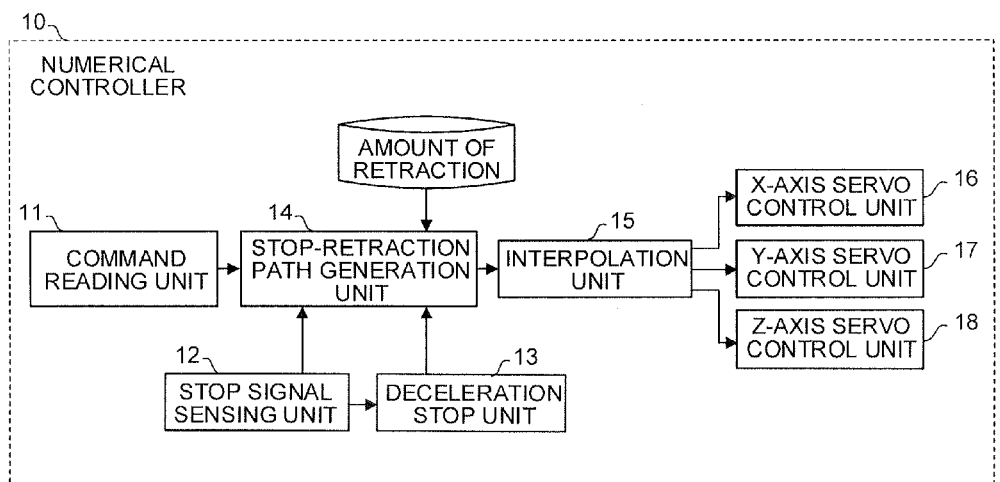
FIG. 2 is a functional block diagram of the numerical controller according to the present invention.

In order to achieve operation control such as that shown in FIG. 1, the numerical controller according to the present invention comprises a command reading unit 11, stop signal sensing unit 12, deceleration stop unit 13, stop-retraction path generation unit 14, interpolation unit 15, and axis servo control units 16 to 18 for controlling X-, Y-, and Z-axis servomotors, as shown in the functional block diagram of FIG. 2.

The command reading unit 11 analyzes a machining program stored in a memory (not shown) in a numerical controller 10 and reads movement path commands for linear axes, relative moving speed commands for a workpiece and the tool, tool direction command for a table, and information on machining control, such as the tool length. Based on the read information, the command reading unit 11 generates and outputs command data to be used for individual axis control.

The stop signal sensing unit 12 senses a stop signal that requests interruption of the machining and the retraction operation and outputs a command for starting retraction control to the deceleration stop unit 13 and the stop-retraction path generation unit 14.

The deceleration stop unit 13 operates in response to the command from the stop signal sensing unit 12 and calculates and outputs speeds at which the axes are decelerated and stopped along a machining path.

The stop-retraction path generation unit 14 performs retraction control processing (described later) in response to the command from the stop signal sensing unit 12 and generates command data for commanding a path (hereinafter referred to as "stop-retraction path") that combines a path for the deceleration stop along a movement path and a retraction path that recedes from the command path. Here the extent of retraction of the tool from the surface of the workpiece should only be previously set by a parameter in the memory (not shown) in the numerical controller 10 or designated by a machining program (NC program).

If there is no command from the stop signal sensing unit 12, that is, if no stop signal is sensed, the stop-retraction path generation unit 14 directly outputs the command data generated by the command reading unit 11 to the interpolation unit 15 without performing the retraction control processing.

The interpolation unit 15 performs interpolation processing such that the positions of the axes are obtained for each interpolation period, based on the command data output by the stop-retraction path generation unit 14.

The axis servo control units 16 to 18 for the X-, Y-, and Z-axes drive the axis motors so that the interpolation unit 15 moves to the obtained axis positions.

The following is a description of the retraction control processing performed on the numerical controller 10 constructed as described above when the machining is interrupted.

In the description to follow, paths of three linear axes (X-, Y-, and Z-axes) and paths of two rotary axes (B- and C-axes) at the tool center point for the case in which the machining ends without being stopped by a stop signal are denoted by Px(t), Py(t), Pz(t), Pb(t) and Pc(t), respectively, as functions of time t. These paths are paths (hereinafter referred to as "command paths") read from the machining program (NC program) by the command reading unit 11.

Further, a three-dimensional vector (Px(t), Py(t), Pz(t)) =Pl(t) based on X-, Y-, and Z-axis coordinates, a two-dimensional vector (Pb(t), Pc(t))=Pr(t) based on the coordinates of the two rotary axes (B- and C-axes), and a five-dimensional vector (Px(t), Py(t), Pz(t), Pb(t), Pc(t))=P(t) based on five-axis coordinates are defined. Pl(t) and Pr(t) denote a linear-axis component and a rotary-axis component, respectively, of the vector P(t).

Let us suppose a case in which the turning-on of the stop signal is sensed at time is under these definitions. On receiving this stop signal, the numerical controller 10 performs deceleration and retraction along the command path P(t). The path at this point in time is denoted by P'(t) and called "stop path". The stop path P'(t) can be represented by the following equation (1) as the sum of a deceleration portion D(t) and a retraction portion R(t) along the command path.

$$P'(t)=D(t)+R(t). \quad (1)$$

In the description to follow, a rotary-axis component of the deceleration portion D(t) is denoted by Dr(t). Further, a linear-axis component and a rotary-axis component of the retraction portion R(t) are denoted by Rl(t) and Rr(t), respectively.

Case of Prior Art

First, retraction control according to a prior art will be described for comparison with the present invention.

If the stop signal is sensed, in the prior art, retraction is started after deceleration stop along the command path is performed. The time at which the deceleration stop is completed, retraction start time, and retraction completion time are denoted by te, trs, and tre, respectively. Thereupon, the deceleration portion D(t) along the command path can be expressed by equation (2) as follows:

$$D(t)=P(u(t)). \quad (2)$$

In equation (2) above, u(t) is a function given as follows:
if t≤ts, u(t)=t (where ts is a time at which the turning-on of the stop signal is sensed),
if ts<t<te, u(t) increases monotonously with u(t)<te satisfied, or
if te≤t, u(t)=u(te).

Thus, the path of the tool at or around the time of detection of the stop signal is identical to the command path P(t) if t≤ts is. The tool is decelerated along the command path if ts<t<te and stopped if te≤t.

Further, the linear-axis component Rl(t) of the retraction portion R(t) can be expressed by equation (3) as follows:

$$Rl(t)=\text{Tool}(Pr'(trs)) \times v(t). \quad (3)$$

In equation (3) above, Tool( ) represents a function for the calculation of a tool-direction unit vector from the positions of the two rotary axes, and Tool(Pr'(trs)) represents a tool-direction unit vector at the start of the retraction. Since this unit vector Tool(Pr'(trs)) represents the tool direction, it includes the linear-axis component only, and its rotary-axis component is zero. In the prior art, the retraction is started after the rotary axes are stopped, so that the tool-direction unit vector does not change during the retraction. Since a method for calculating the tool-direction unit vector from the positions of the two rotary axes is a conventional technique (e.g., Japanese Patent Application Laid-Open No. 2014-010566), a detailed description of the function Tool( ) will be omitted.

Further, regarding v(t),
if t≤trs, v(t)=0,
if trs<t<tre, v(t) increases monotonously,
if tre≤t, v(t)=R.

Here R is an amount of retraction, which is previously designated by a parameter or the machining program (NC program). In consequence,
if t≤trs, R(t)=0 with
if trs<t<tre, gradual retraction (increase of R(t)) is performed,
if tre≤t, R(t)=R (amount of retraction), or retraction of the tool by R.

Since the rotary axes (B- and C-axes) can never be moved by the retraction operation, moreover, the rotary-axis component Rr(t) of the retraction portion R(t) is zero.

In this way, we obtain Pr'(trs)=Dr(trs)=Pr(u(trs)).

Figure 3:
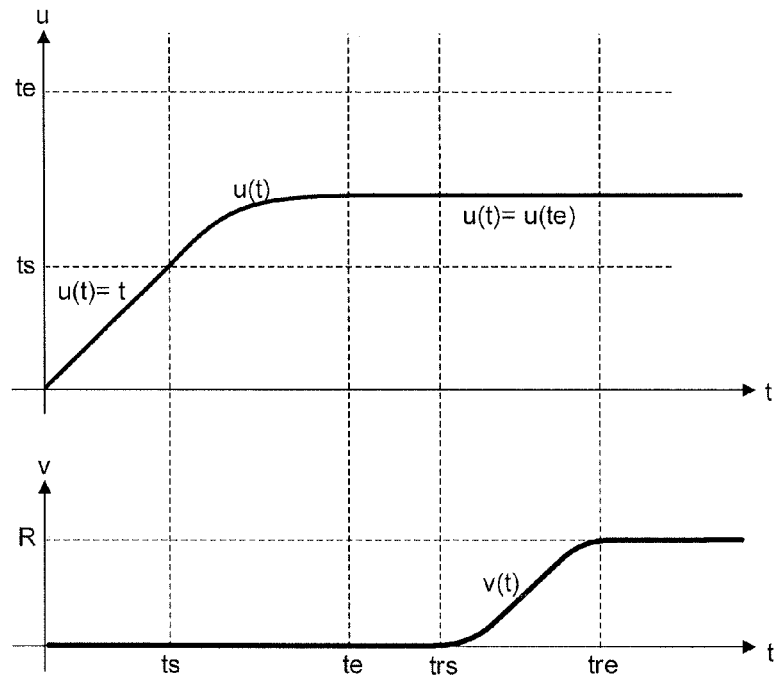
FIG. 3 shows graphs individually illustrating functions u(t) and v(t) according to a prior art.

FIG. 3 shows graphs individually illustrating the functions u(t) and v(t) according to the prior art.

Thus, in the prior art, the stop path can be expressed by equation (4) as follows:

$$P'(t) = D(t) + R(t) \quad (4)$$
$$= P(u(t)) + \text{Tool}(Pr(u(trs))) \times v(t).$$

<Case of Present Invention>

In the retraction control processing of the present invention performed when the machining is interrupted, in contrast, the retraction is performed simultaneously with the deceleration stop along the command path if the stop signal is sensed. The time at which the deceleration stop is completed and retraction completion time are denoted by te and tre, respectively. Retraction start time trs is coincident with deceleration stop start time ts. In the present invention, the deceleration stop along the path may be completed either before or after the retraction. Thus, te<tre, te=tre, or te>tre may be optionally selected. Any of these values may be defined beforehand in a set area in the memory (not shown) in the numerical controller 10 by a manufacturer or set in accordance with the properties of the machining machine to be controlled by a user.

A path generated by the retraction control processing of the present invention is denoted by P"(t) and called "stop retraction path". As in the prior art, the stop retraction path P"(t) can be represented by the following equation (5) as the sum of a deceleration portion D(t) and a retraction portion R(t) along the command path.

$$P''(t)=D(t)+R(t). \quad (5)$$

In equation (5) above, as in the prior art, the deceleration stop portion D(t) can be expressed by equation (2) above, and a linear-axis component Rl(t) of the retraction portion R(t) can be expressed by equation (6) as follows:

$$Rl(t)=\text{Tool}(Pr''(t)) \times v(t). \quad (6)$$

Here Tool(Pr"(t)) represents a tool-direction unit vector at time t. It is to be noted that the unit vector Tool(Pr"(t)), unlike that of the prior art, changes from moment to moment. For the retraction operation, as in the prior art case, only the three linear axes (X-, Y-, and Z-axes) are moved, and the rotary axes are not. Accordingly, a rotary-axis component Rr(t) of the retraction portion R(t) is zero.

Thus, we have Pr"(t)=Dr(t)=Pr(u(t)).

Figure 4:
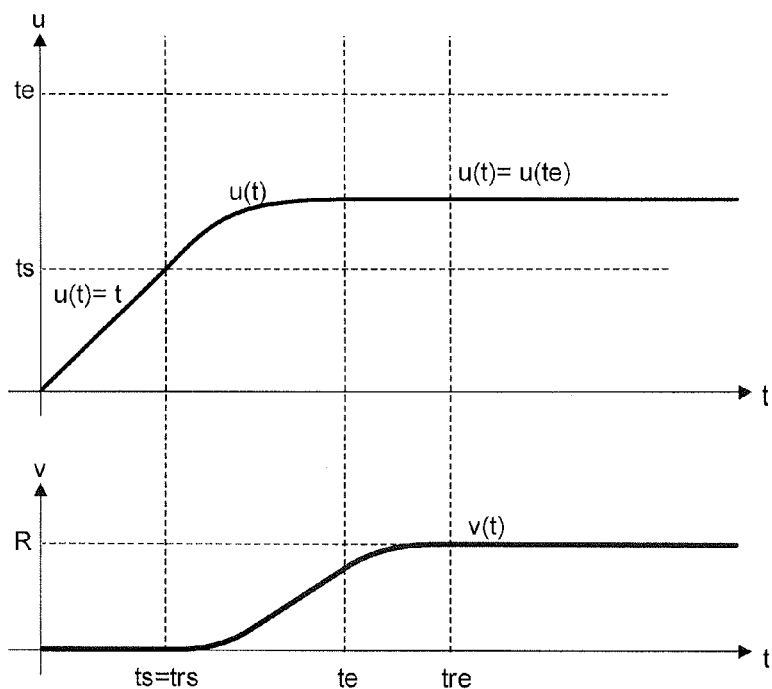
FIG. 4 shows graphs individually illustrating functions u(t) and v(t) according to the present invention.

FIG. 4 shows graphs individually illustrating the functions u(t) and v(t) according to the present invention.

In the present invention, the functions u(t) and v(t) may be defined beforehand in the set area in the memory (not shown) in the numerical controller 10 by the manufacturer or monotonous increase parts of the functions may be set, in accordance with the properties of the machining machine to be controlled by the user.

Thus, in the prior art, the stop path can be expressed by equation (7) as follows:

$$P''(t) = D(t) + R(t) \quad (7)$$
$$= P(u(t)) + \text{Tool}(Pr(u(t))) \times v(t).$$

In this way, according to the present invention, the retraction operation is achieved corresponding to the tool direction that changes from moment to moment in parallel with deceleration stop. Consequently, retraction in the tool direction can be performed without damaging the machined surface.

Figure 5:
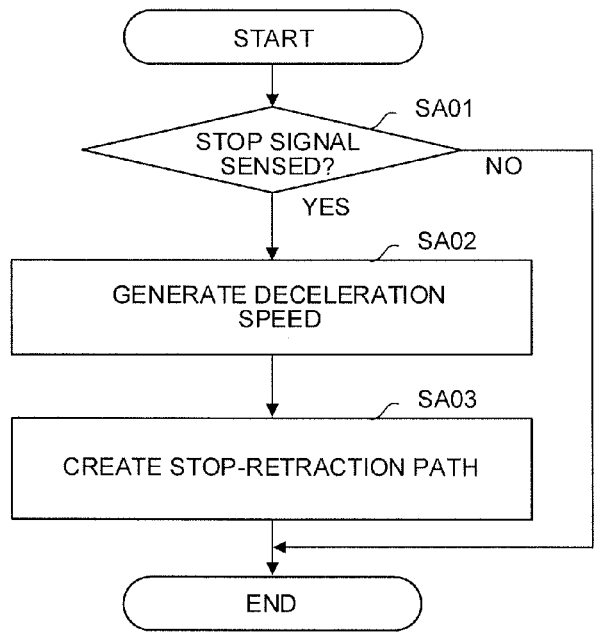
FIG. 5 is a flowchart showing steps of retraction control processing performed on the numerical controller shown in FIG. 2.
Figure 6:
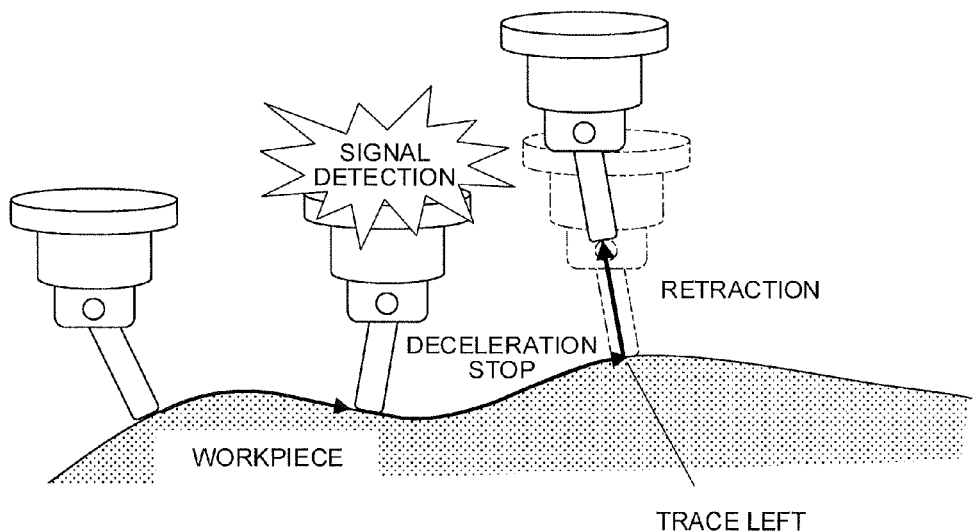
FIG. 6 is a schematic diagram showing a retraction operation according to the prior art.

A flow of the retraction control processing performed on the numerical controller 10 shown in FIG. 2 will be described with reference to the flowchart of FIG. 5. This processing is performed for each control period of the machining control.

[Step SA01] It is determined whether or not the stop signal that requests interruption of the machining and the retraction operation is sensed. If the stop signal is sensed, the processing proceeds to Step SA02. If not, the command data analyzed and output by the command reading unit 11 is output directly to the interpolation unit 15, whereupon this processing ends.

[Step SA02] The deceleration stop unit 13 calculates and outputs speed data such that the tool moves along its movement path as the deceleration stop is performed.

[Step SA03] Based on the command data analyzed and output by the command reading unit 11 and the speed data output by the deceleration stop unit 13, the stop-retraction path generation unit 14 generates the stop retraction path P"(t) and outputs it to the interpolation unit 15.

While one embodiment of the present invention has been described herein, the invention is not limited to this embodiment and can be carried out in other embodiments based on appropriate modifications.

The invention claimed is:

1. A numerical controller which controls a machine tool by analyzing and executing a machining program to machine a workpiece, the machine tool comprising at least two linear axes and at least one rotary axis, the numerical controller comprising:
a command reading unit configured to read and analyze the machining program and generate command data indicative of movement paths for the linear and rotary axes;
a stop signal sensing unit configured to sense a stop signal which requests interruption of machining by the machine tool and retraction of the machine tool;
a deceleration stop unit configured to generate speed data for decelerating and stopping the linear and rotary axes along the movement paths when the stop signal is sensed by the stop signal sensing unit;
a stop-retraction path generation unit configured to generate stop retraction path command data indicative of a stop retraction path, the stop retraction path being a combination of a path for decelerating and stopping the linear and rotary axes along the movement paths and a retraction path receding from the movement paths, based on the command data generated by the command reading unit and the speed data generated by the deceleration stop unit, when the stop signal is sensed by the stop signal sensing unit; and
an interpolation unit configured to obtain, for each of the linear and rotary axes, a position of the axis for each interpolation period based on the stop retraction path command data generated by the stop-retraction path generation unit, when the stop signal is sensed by the stop signal sensing unit,
the numerical controller controlling the machine tool along the stop retraction path.

2. The numerical controller according to claim 1, wherein an amount of retraction, which is equivalent to a distance by which the retraction path recedes from the movement paths, is previously set in the numerical controller or set by the machining program.

* * * * *